(12) United States Patent
Gefen et al.

(10) Patent No.: US 11,416,380 B2
(45) Date of Patent: Aug. 16, 2022

(54) MICRO SERVICES TESTS PRIORITIZATION

(71) Applicant: EMC IP Holding Company LLC, Hopkinton, MA (US)

(72) Inventors: Avitan Gefen, Tel Aviv (IL); Roi Gamliel, Moshav Tkuma (IL); Amihai Savir, Sansana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/742,470

(22) Filed: Jan. 14, 2020

(65) Prior Publication Data
US 2021/0216444 A1 Jul. 15, 2021

(51) Int. Cl.
*G06F 11/36* (2006.01)
*G06F 9/50* (2006.01)
(Continued)

(52) U.S. Cl.
CPC ...... *G06F 11/3688* (2013.01); *G06F 11/3672* (2013.01); *G06F 11/3684* (2013.01); *G06F 8/36* (2013.01); *G06F 8/60* (2013.01); *G06F 11/3604* (2013.01); *G06F 11/3636* (2013.01); *G06F 11/3664* (2013.01); *G06F 11/3676* (2013.01); *G06F 16/8373* (2019.01); *G06F 16/906* (2019.01); *G06F 16/9024* (2019.01)

(58) Field of Classification Search
CPC ............. G06F 11/3688; G06F 11/3684; G06F 11/3664; G06F 11/3672; G06F 8/658; G06F 8/65; G06F 8/75; G06F 8/71; G06F 9/507; G06F 9/45504; G06F 9/5055; G06F 11/368; G06F 11/3604; G06F 11/3438; G06F 11/3476; G06F 11/3676; G06F 11/3636; G06F 16/8373; G06F 16/951; G06F 16/81; G06F 16/906; G06F 16/9024; G06F 8/36; G06F 8/60; G06F 8/427; G06F 8/4441; G06F 8/41

See application file for complete search history.

(56) References Cited

U.S. PATENT DOCUMENTS 10,102,111 B2 * 10/2018 Rajagopalan ....... G06F 11/3672
10,606,583 B2 * 3/2020 Benedetti ................ G06F 8/658
(Continued)

OTHER PUBLICATIONS

Genc Mazlami et al., Extraction of Microservices from Monolithic Software Architectures, IEEE 2017, [Retrieved on Mar. 21, 2022]. Retrieved from the internet: <URL: https://ieeexplore.ieee.org/stamp/stamp.jsp?tp=&arnumber=8029803> 8 pp. 524-531 (Year: 2017).*
(Continued)

*Primary Examiner* — Anibal Rivera
(74) *Attorney, Agent, or Firm* — Workman Nydegger

(57) ABSTRACT

One example method includes identifying a changed microservice whose code has been changed, mapping, for each microservice in a group of microservices that includes the changed microservice, microservice dependencies associated with the changed microservice, determining, for each microservice in the group, a relative risk that the microservice will be adversely affected by the change to the code of the changed microservice, and based on the respective relative risks, generating a test order indicating an order in which the microservices in the group will be tested.

20 Claims, 5 Drawing Sheets

(51) Int. Cl.
    *G06F 8/41*     (2018.01)
    *G06F 8/60*     (2018.01)
    *G06F 8/36*     (2018.01)
    *G06F 16/835*     (2019.01)
    *G06F 16/906*     (2019.01)
    *G06F 16/901*     (2019.01)

(56) References Cited

U.S. PATENT DOCUMENTS

| | | | |
|---|---|---|---|
| 2018/0039567 A1* | 2/2018 | Rajagopalan | G06F 11/3672 |
| 2019/0179631 A1* | 6/2019 | Benedetti | G06F 8/658 |
| 2020/0019388 A1* | 1/2020 | Jaeger | G06F 8/36 |
| 2020/0259715 A1* | 8/2020 | Schermann | H04L 41/22 |
| 2020/0285451 A1* | 9/2020 | Agarwal | G06F 8/60 |

OTHER PUBLICATIONS

Liang Bao et al., Performance Modeling and Workflow Scheduling of Microservice-Based Applications in Clouds, Sep. 2019, [Retrieved on Mar. 21, 2022], Retrieved from the internet: <URL: https://ieeexplore.ieee.org/stamp/stamp.jsp?tp=&arnumber=8651324> 16 pp. 2101-2116 (Year: 2019).*

* cited by examiner

MTBF: Mean Time Between Failures
MTTD: Mean Time to Diagnose
MTTR: Mean Time to Repair
MTTF: Mean Time to Failure

MICRO SERVICES TESTS PRIORITIZATION

FIELD OF THE INVENTION

Embodiments of the present invention generally relate to the testing of microservices. More particularly, at least some embodiments of the invention relate to systems, hardware, software, computer-readable media, and methods for prioritizing the performance of microservice tests.

BACKGROUND

Microservices are a variant of the service-oriented architecture (SOA) architectural style that structures an application as a collection of loosely coupled services, that is, microservices. The benefit of decomposing an application into different smaller services is that this approach may improve modularity and may make the application easier to understand, develop and test. This approach may also parallelize development by enabling small autonomous teams to develop, deploy, and scale, their respective microservices independently of each other. While the microservices approach has thus proven beneficial in some regards, that approach has also introduced some challenges.

For example, because the microservices may be developed autonomously with respect to each other, it can be difficult to track and monitor the large number of microservices, potentially in the hundreds or more, developed by different teams in a given environment. As well, it may be difficult to determine the relationships between/among the various microservices in a group. These considerations are further complicated by the fact that the microservices are updated from time to time with new and/or modified code whose performance must be tested with quality assurance processes. Due, at least, to the large number of microservices, and the relationships between them, it can be difficult to determine which tests should be performed, the particular microservices on which the tests should be performed, and the order in which the tests should be performed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
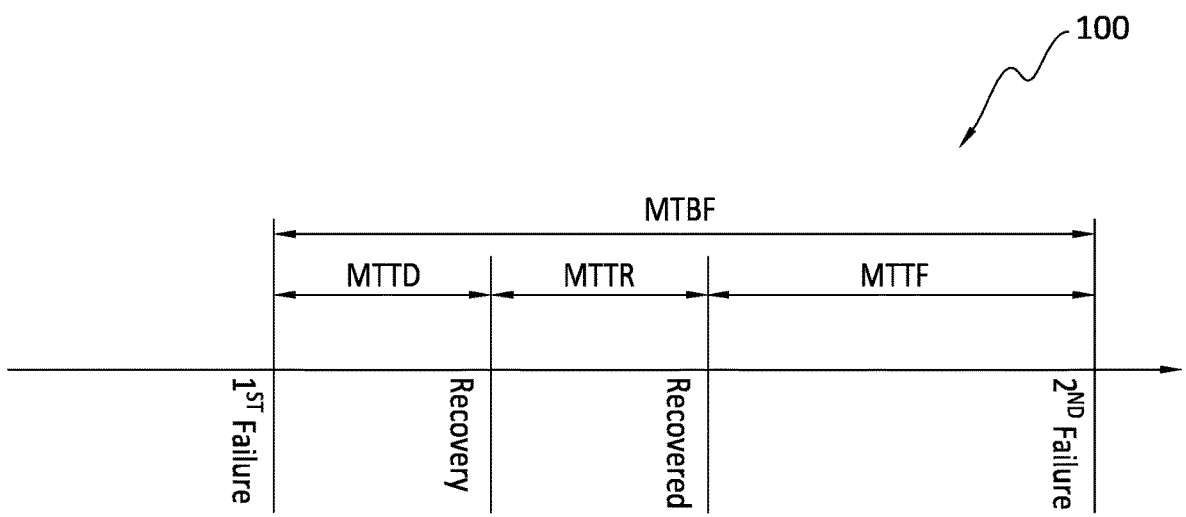
FIG. 1 discloses aspects of an example timeline indicating relationships between failures, diagnosis, and repairs.

Embodiments of the present invention generally relate to the testing of microservices. More particularly, at least some embodiments of the invention relate to systems, hardware, software, computer-readable media, and methods for prioritizing the performance of microservice tests.

In general, example embodiments of the invention may be employed in a microservices development environment in which new features and bug fixes are introduced to the code base. The changes to the code base may necessitate the performance of various tests to ensure that the new and/or modified code runs correctly. Because a large code base may be associated with, or at least imply, a large number of tests, embodiments of the invention may serve to prioritize, and order, tests according to the relatively likelihood of failure of the associated code portions.

Accordingly, embodiments of the invention may comprise, or consist of, a methodology that may improve a quality assurance (QA) process by recommending and prioritizing which tests will be run on one or more microservices, and the order in which the recommended tests will be performed. These tests may be performed, for example, after changes have been made to the code of one or more of the microservices. At least some embodiments may employ graphical analysis over the API dependencies between microservices in the microservice environment to identify the areas where there is the greatest risk of a microservice failure.

Among other things, the approach employed in embodiments of the invention may help to reduce the usage of software testing resources, such as engineers and computing resources for example, since such embodiments may help to identify failed tests as soon as possible. Embodiments of the invention may be particularly useful in a software-as-a-service (SaaS) environment where a microservice architecture may be used, although the scope of the invention is not limited to such environments. Some particular embodiments may, in SaaS and/or other environments, provide for a relative reduction in the mean time to diagnose (MTTD) a problem.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

One advantageous aspect of at least some embodiments of the invention is that such embodiments may enable identification of failed tests as soon as possible. An embodiment of the invention may provide for a relative cost reduction due to more effective and efficient utilization of those resources responsible for developing and testing microservice code. For example, such an embodiment may reduce the amount of time spent by engineers on troubleshooting and bug fixes, and thus allow for the engineers to spend more time on microservice implementation and development. An embodiment of the invention may provide for a relatively faster time to production for a microservice, and faster feature development of simpler and less buggy code may provide a significant advantage relative to competitor products that compete with those that involve one or more of the microservices. Finally, an embodiment of the invention may be advantageous insofar as enables relative faster reactions to customer requests for new features, and the faster release of such new features. Such responsiveness may elevate the customer experience and customer satisfaction.

A. Overview of Microservice Reliability and Related Considerations

With attention first to FIG. 1, embodiments of the invention may be employed in connection with one or more microservices, at any of a variety of stages. Thus, embodiments may be employed in connection with the development of new microservices, modified microservices, and microservices that are running in a production environment. More generally, such embodiments may be employed at any stage in the life of a microservice.

As used herein, 'microservices' embraces, but is not limited to, a service-oriented architecture (SOA) architectural style that structures an application as a collection of loosely coupled services, that is, microservices. In a microservices architecture, services may be fine-grained and the protocols relatively lightweight. The benefit of decomposing an application into different smaller services is that such an approach may improve modularity, while also making the application easier to understand, develop and test. The microservices approach may also parallelize code development by enabling small autonomous teams to develop, deploy and scale their respective services independently.

While a microservices approach may provide various benefits, a microservice architecture may also impose some costs, one of which is the need to manage complex environments that are composed of hundreds of moving parts. The fact that different microservices are developed by different teams, that could be completely separated and communicate through contracts such as Rest API and Messaging, may imply that no one person really knows the entire code base, and automation tools and intelligent analysis may be needed to lower the risk of bugs, and to save time.

As well, and with reference now to FIG. 1, reliability and availability may be of particular interest where microservices are employed in a SaaS system. For example, and with reference to the example timeline 100 of FIG. 1, a primary aim when developing a SaaS solution may be to increase availability to the customer by improving reliability of the microservices. Availability may be expressed using the equation: availability=uptime/(uptime+downtime), which may be equivalent to: MTTF/MTBF=MTTF/(MTTD+MTTR+MTTF), where MTTF is Mean Time to Failure, MTBF is Mean Time Between Failures, MUD is Mean Time to Diagnose, and MTTR is Mean Time to Repair.

There are two ways to increase this ratio, that is, to improve availability, namely, either increase MTTF, or reduce MTTD and/or MTTR. In some environments, particular focus may be placed on increasing MTTF. MUD may be assumed to be high in many circumstances, since the customer has to discover the error, try and fix it themselves, raise a support call, and/or escalate to engineering for resolution. Thus, MUD may not be readily or reliably controlled by administrators or other users. Further, MTTR may be reduced to some extent, but usually the minimal effort involves producing a fix, testing the fix, and then passing the fix to a support team which, in turn, provides the fix to the customer, who then has to apply the fix. As a result of so many transactions and involved parties, MTTR may not be the most fruitful avenue to improve availability of a microservice. Thus, a better approach may to try and minimize failures, thereby reducing MTTF, through extensive checks and balances on the microservices that are rolled out to the customer.

In the example environment of an SaaS world, embodiments of the invention may revisit the availability equation. With the correct operations monitoring in place, MUD can be measured in minutes instead of days. Because a microservice may be a single-instance deployment, it may be acceptable, and useful, to hack something such as a database, a configuration setting, or even some code, in an effort to help reduce MTTR.

In some embodiments, and as disclosed in more detail elsewhere herein, it may be possible to progress from a failure through to fix without notice by external users. It should be noted that administrators or other personnel may not want to decrease MTTF unnecessarily, nor necessarily concentrate on MTTF reduction so heavily while still keeping the MTTF:MTBF ratio and, hence, the availability, high. For example, the overheads and cost of increasing MTTF may negatively impact other operations, as developers may become so risk averse that they are reluctant to make changes to the microservice code.

In light of the foregoing, and other points, embodiments of the invention embrace a methodology that automatically generates recommendations for test prioritization, such as in a microservice environment for example. At least some embodiments employ graphical analysis of the API dependencies between microservice in the microservice environment to identify the areas that are at the greatest risk of failure. Recommendations for test prioritization, such as may be generated by embodiments of the invention, may provide benefits such as, but not limited to, identification of failed tests as soon as possible, cost reduction due to better utilization of engineering resources, fewer potential bugs, and better customer experience through improved availability and/or reliability of microservices employed by the customer.

B. Microservice Dependencies and Service Mesh Environment

Figure 2:
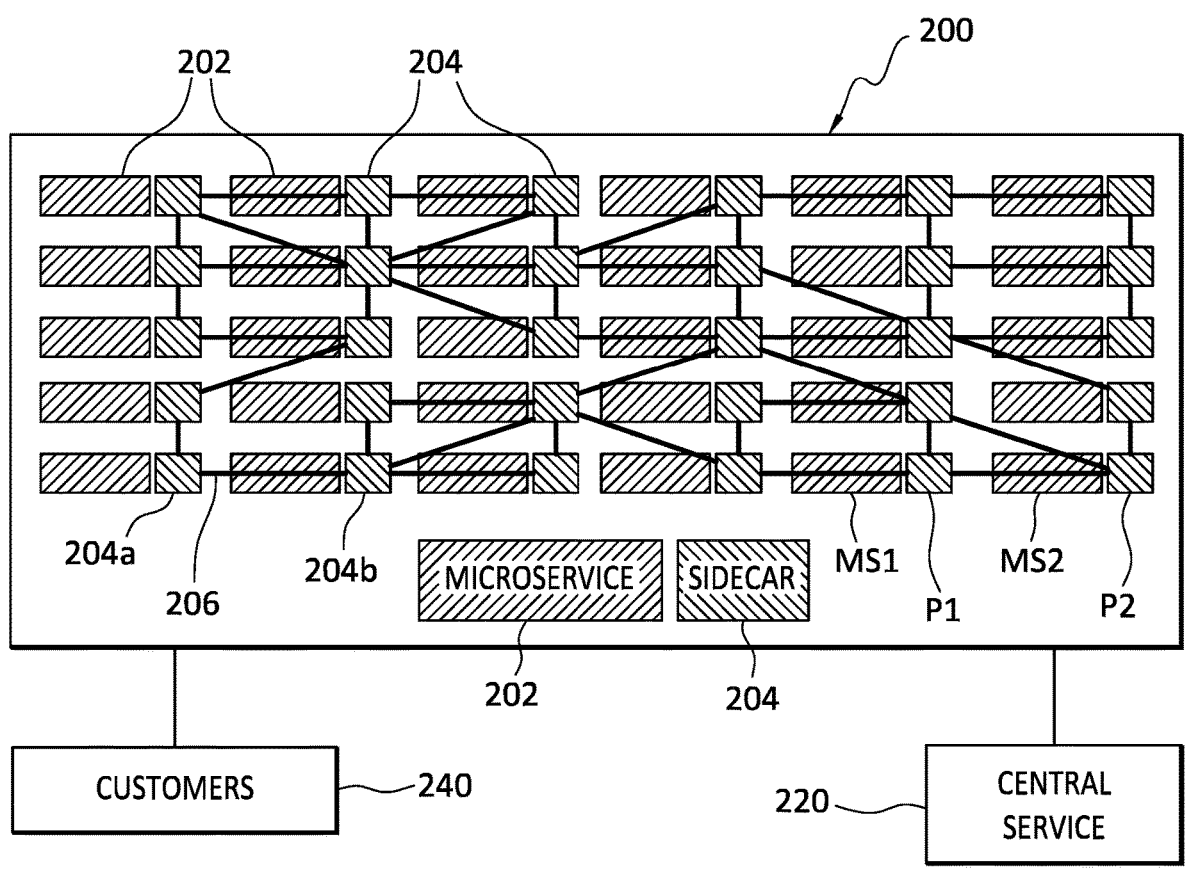
FIG. 2 discloses aspects of an example API graph.

Directing attention now to FIG. 2, details are provided concerning an example operating environment for some embodiments of the invention. Among other things, embodiments of the invention embrace methods for improving a QA process by recommending and prioritizing which tests, and in which order to run, after given changes in the code. Initially, an API dependency graph may be generated that provides a representation of the microservices environment, and then a graphical analysis may be performed of the microservices environment to identify the areas that are at the greatest risk of failure. As discussed below, a dependency graph may be referred to as such even though a microservice indicated in the graph (such as microservice MS-1 302 of FIG. 3), is not dependent on the other illustrated microservices. Thus, a mapping of dependencies may reveal not only dependent relationships, but may reveal independent, or non-dependent, relationships as well (see, e.g., FIG. 3, microservice MS-1 302 is not dependent upon microservice MS-3 306, but microservice MS-3 306 is dependent upon microservice MS-1 302).

As shown in FIG. 2, one way to depict API dependencies among microservices is through the use of an API graph 200 that graphically represents a service mesh. In general, a service mesh refers to the network of microservices that make up a distributed application, and the interactions between those microservices. As a service mesh grows in size and complexity, it may become harder to understand and manage. Tools such as/stip. (https://istio.io/), for example, may enable control of a service mesh, while also providing behavioral insights and operational control over the service mesh as a whole.

In general, the service mesh may take the logic governing microservice-to-microservice communication out of individual microservices and abstract that logic to a layer of infrastructure. In a service mesh, requests may be routed between microservices 202 through proxies 204 in their own infrastructure layer. For this reason, individual proxies 204 that make up a service mesh are sometimes called "sidecars," since those proxies 204 each run alongside a respective microservice 202, rather than within the microservice 202. Taken together, these "sidecar" proxies 204, decoupled from, but associated with, their respective microservice 202, form the service mesh 200. As further indicated in FIG. 2, and discussed below, one or more of the proxies 204 may have a relationship with one or more other proxies 204. For example, as shown in FIG. 2, the proxy 204a is related in some way to the proxy 204b, as indicated by the line 206 connecting the two. Other proxy relations are likewise disclosed in the example service mesh 200 of FIG. 2.

When the service mesh 200 is created, any logic can be added to a proxy 204. The embodiment of FIG. 2 includes a central service 220 to which the proxies 204 may send data. Once a proxy P1 (which may be any of the proxies 204), relays a call from MS1 (which may be any of the microservices 202) to proxy P2 (which may be any other proxy 204) of MS2 (which may be any other microservice), that data may be sent by the proxy P1 and/or proxy P2 to the central service 220. Collecting this data overtime, using the central service 220, may enable dynamic generation and modification of the API graph 200.

As further indicated in FIG. 2, one or more customers 240 may access one or more of the microservices 202. In some embodiments, the microservices 202 may be hosted in a cloud computing environment, such as a cloud datacenter, and/or in an on-premises environment of a customer. As such, the microservices 202 may serve to carry out processes including, but not limited to, data deduplication, replication, data backup, data restore, and any other operations relating to data protection. The scope of the invention is not limited to data protection operations however, nor to the implementation of microservices in a cloud computing environment. Thus, the foregoing are presented only by way of example, and are not intended to limit the scope of the invention in any way.

Figure 3:
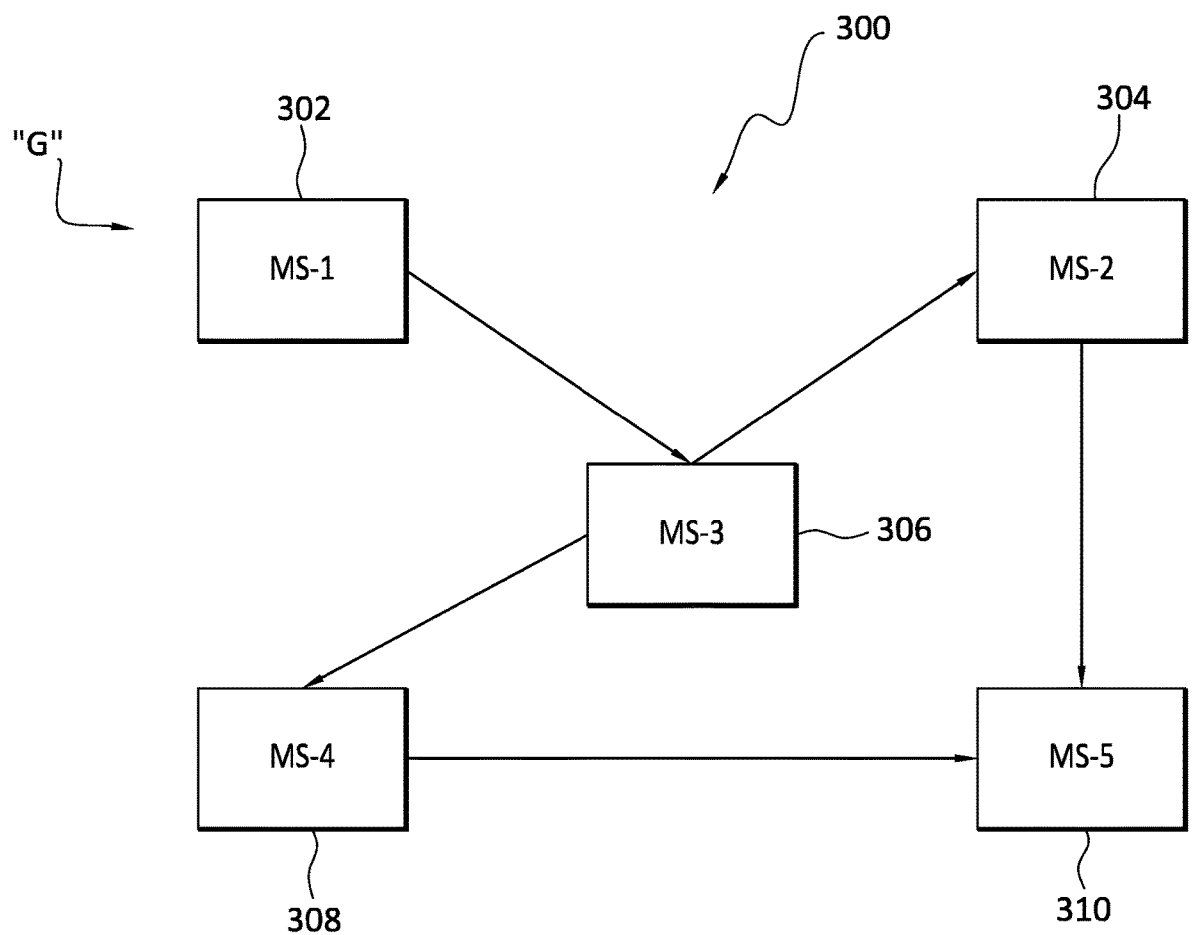
FIG. 3 discloses aspects of an example service mesh.

With continued reference to FIG. 2, and turning now to FIG. 3 as well, the outcome of the API graph 200 generation is a network structure that is referred to herein as "G." A directed edge (u, v) in G represents the fact that microservice 'v' consumes an API from microservice 'u.' That is, 'v' is the consumer and 'u' is the producer.

Given a code change in a microservice, the distance from the microservice where the change happened in G may be deduced. Distances may be calculated using a Breadth-First-search (BFS), or similar, procedure, where the minimal or shortest route is taken as the distance between two microservices. A BFS may take the form of an algorithm for traversing a graphical structure, such as the API graph 200. A BFS may commence at a root location, which may be the changed microservice, and then traverse all the microservices that are at a first distance from the microservice whose code was changed. This process may be repeated for microservices that are at a second distance from the microservice whose code was changed. More generally, a BFS may traverse all microservices up to, and including, a distance 'n' from the microservice whose code was changed, where 'n' may be any positive integer 1. Note that the BFS is provided only by way of example, and other algorithms and processes for determining distances between/among microservices may alternatively be used.

In general, embodiments of the invention may employ a relationship in which the longer the distance that a particular microservice is from the microservice whose code was changed, the smaller the risk that the particular microservice will be adversely affected by the code change to the other microservice. For example, the following protocol may be employed: the microservice whose code has been changed may be assigned risk=1, that is, distance=0, while the microservice(s) that have an edge connection to the changed microservice are assigned risk=0.5, that is, distance=1. As will be apparent, this protocol can be extended to any number of microservices, and the relationships and distances between/among those microservices. The foregoing protocol is presented solely by way of example and is not intended to limit the scope of the invention in any way. More generally, any other protocol that operates to assign a risk level to a microservice based on the relation of that microservice to another microservice whose code has been, or will be, changed, may be employed. Thus, in another embodiment, another protocol may employ exponential back off, or logarithmic back off to define a risk score of between 0 and 1 for one or more microservices that are connected in some way with a microservice whose code has been, or will be, changed.

Embodiments of the invention may be implemented in connection with end-to-end, or E2E, tests conducted between/among two or more microservices. As used herein, an E2E test embraces, but is not limited to, processes that test a microservice from beginning to end to determine if the microservice operates as it is supposed to. An E2E test may take account of the relationship of the tested microservice to any associated microservice(s) and may serve to ensure that all of the implicated microservices operate together properly. Thus, an E2E test may test a microservice, such as from a user perspective, by simulating an actual scenario or real life operating conditions, and validating the microservice operations for integrity and operability.

A risk score for failure of an E2E test may be defined as the sum of risk scores of the microservices related to the E2E test, thus:

$$R(test_j)=\Sigma R(MS_i), \forall \text{ MS that are related to } test_j$$

where R(test), and R(MS) are the risk scores for tests and/or microservice. The E2E tests may then be prioritized, for implementation, based on their respective risk score. The following example, presented with reference to FIG. 3, is illustrative.

Let 'G' be the network of a microservices environment that may be represented as a service mesh 300. In this example, G comprises five microservices, namely, MS-1 302, MS-2 304, MS-3 306, MS-4 308, and MS-5 310. The structure of G may be deduced, for example, by the generation of a service mesh 300 between the different microservices 302-310. For the purposes of illustration, the proxies, or sidecars, are not illustrated in FIG. 3, although it should be understood that each of the microservices 302-310 is associated with a respective proxy, as indicated in the example configuration disclosed in FIG. 2.

Now, assume that a code change is introduced in microservice MS-3 306. The microservices that are at the greatest relative risk to experience a problem as a result of that code change are those microservices that are downstream from microservice MS-3 306, that is, the microservice(s) which is/are consumers of the service provided by the microservice MS-3 306. Moreover, and as noted herein, the closer a particular microservice is to the changed microservice, the greater the risk that a problem will occur with that particular microservice.

Note that a microservice which consumes the changed microservice may be referred to herein as being dependent upon, or downstream of, the changed microservice. On the other hand, a microservice may be upstream of, and therefore not dependent upon, the changed microservice. As well, two microservices may each be a consumer of the other microservice, and also a source of a microservice to the other microservice. That is, a given microservice may be both a source and a consumer with respect to another microservice. In a variation of this notion, the changed microservice MS-3 306, for example, is both a source and a consumer, but not with respect to the same microservice. Particularly, changed microservice MS-3 306 is a source to microservices MS-4 308 and MS-2 304, and a consumer with respect to the microservice MS-1 302. Further, while the changed microservice MS-3 306 is not directly connected with the microservice MS-5 310, the changed microservice MS-3 306 is nevertheless associated, or connected, indirectly to the microservice MS-5 310 by way of the microservice MS-4 308.

As the foregoing examples illustrate, microservices may be connected to each other in a variety of ways and, accordingly, two microservices that are directly associated with each other, or indirectly associated by way of one or more other microservices, may be generally referred to as being connected to each other even though one or both of the microservices is not a supplier/consumer of the other microservice.

However, because a service mesh may be quite large, it is possible that any given changed microservice may be 'connected' to a large number of other microservices which, in practice, may have little or no bearing on the changed microservice. Thus, it may be useful to identify a boundary distance such that any microservices beyond that distance from the changed microservice need not be accounted for in testing. For example, it might be decided that only those microservices that are a distance 'n' from the changed microservice will be considered in determining which microservices will be tested, and in what order. As noted, the distances may be identified, for example, by a BFS, or comparable, process. Once the BFS has identified all microservices that are a distance 'n' (where 'n' is any positive integer) from the changed microservice, the BFS process may stop.

In the example case of FIG. 3, the microservice MS-2 304 and microservice MS-4 308 are the closest to microservice MS-3 306, each being a distance of 1 from the changed microservice MS-3 306. On the other hand, microservice MS-5 310, which is not downstream of the changed microservice MS-3 306, is a distance of 2 from the changed microservice MS-3 306. This distance '2'=the sum of the distance '1' from microservice MS-5 310 to microservice MS-4 308+the distance '1' from microservice MS-4 308 to the changed microservice MS-3 306. This distance '2' may alternatively be obtained by adding the respective distances of '1' between microservice MS-5 310 to microservice MS-2 304, and between microservice MS-2 304 to microservice MS-3 306.

Note that the relative risk associated with a particular microservice may be a function not only of distance, but additionally, or alternatively, a function of the relation between microservices. For example, suppose that microservice MS-5 310 is a provider of a service to consumer microservice MS-3 306. Even though the two microservices are at a distance of '1' from each other, there is no risk to microservice MS-5 310, since it is upstream of microservice MS-3 306. As a final example, microservice MS-1 302 is not consuming anything from microservice MS-3 306, that is, microservice MS-1 302 is not downstream of microservice MS-3 306. As such, the microservice MS-1 302 is not at risk of problems from the code change that was made to microservice MS-3 306.

With these relationships in view, a testing protocol may now be defined. For example, given a set of tests {t-1, t-2, t-3, t-4, t-5}, where each test t-x is related to MS-x, it may be desirable to order the tests, using their respective risk score, as follows: t-3, t-4, t-2, t-5, t-1. Note that microservice MS-2 304 and microservice MS-4 308 both have the same distance (1), and relationship (consumer), with microservice MS-3 306. Thus, the order of t-4 and t-2 may be reversed without adverse impact to the test prioritization or associated tests.

C. Example Methods

Figure 4:
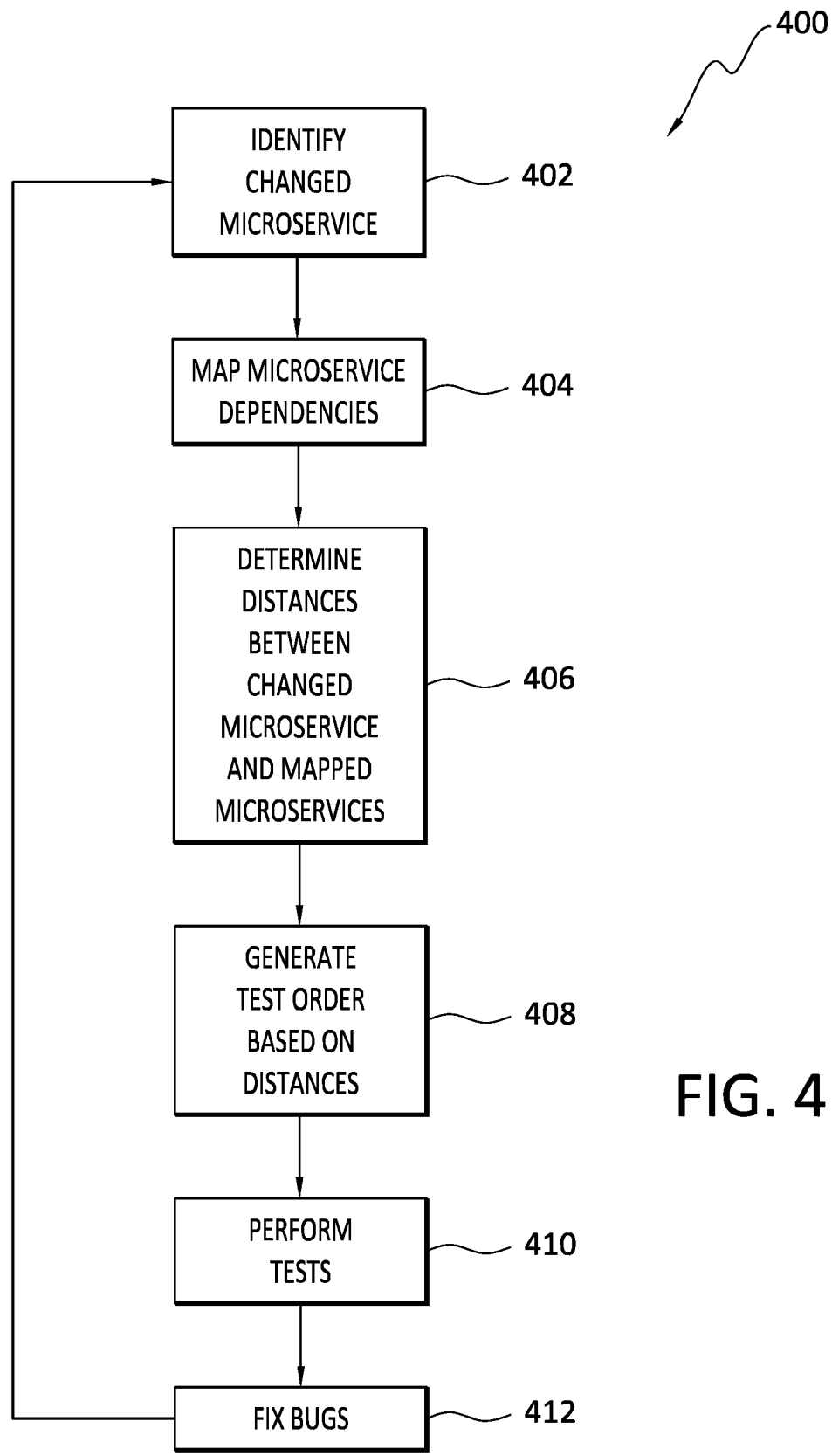
FIG. 4 discloses aspects of an example method for generating a test order.

With reference now to FIG. 4, details are provided concerning methods for defining and implementing prioritized testing for microservices, where one example method is denoted generally at 400. In some embodiments, part, or all, of the method 400 may be performed by, and/or at the direction of, a central service, an example embodiment of which is disclosed herein. However, the scope of the invention is not limited to performance of the method 400 by any particular entity, or group of entities.

The example method 400 may begin at 402 with identification of a microservice whose code has been changed in some way, such as by a developer for example. This may involve pulling this information from a source such as a central service, or this information may be pushed to the entity that is performing the method 400. The microservice 402 may be part of a group of microservices, and the size and extend of the group may, or may not, be arbitrarily defined.

When the changed microservice has been identified 402, the other microservices in the group may then be identified and dependencies mapped 404. One or more of the other microservices in the group may, or may not, be dependent upon the microservice whose code has changed. The microservice whose code has changed may be referred to herein simply as the 'changed microservice.'

As disclosed herein, such dependencies may be identified in various ways, one example of which involves the user of a service mesh. In this example, the dependencies may be identified by examining the service mesh to determine where dependencies exist in a particular group of microservices. Mapping the dependencies may involve identifying, for example, (i) which microservices are consumed by the changed microservice, and/or (ii) which microservices consume the changed microservice, and/or (iii) microservices that are suppliers/consumers of a microservice supplied to, or received from, the changed microservice. As well, mapping the dependencies 404 may involve identifying, for a given group of microservices, any and all microservices directly or indirectly connected to the changed microservice.

After the microservices have been identified and dependencies mapped 404, the respective distances between the changed microservice, and the other microservices in the group, may be determined 406. One or more of the distances may be calculated 406 using a BFS or similar process. The distance between a given microservice and the changed microservice may represent a relative risk that the given microservice will experience a problem as a result of the microservice code change. This may be an inverse relationship, such that where a relatively larger distance corresponds to a relatively lower risk, while a relatively smaller distance corresponds to a relatively greater risk. In some embodiments, the distances may be calculated 406 for all microservices whose distance from the changed microservice is ≥'n,' where 'n' is any integer ≥1. In some embodiments, distances may only be calculated 406 for those microservices which are direct consumers of the changed microservice. More generally, the microservices whose distance is calculated 406 may be selected according to any criteria, and the foregoing are presented only by way of example.

When the distances between the various microservices and the changed microservice are known, a test order may then be generated 408. The test order may identify a respective test, or tests, to be performed for each of the various microservices. The order in which the tests are performed may be determined based on relative distance from the changed microservice, such that microservices relatively closer to the changed microservice may be tested before microservices that are relatively further from the changed microservice. After determination of the test order 408, the tests may then be performed in the specified order 410, and any bugs or other problems identified during testing may be fixed 412.

As shown in FIG. 4, the method 400 may be performed recursively, such as each time after the code of a microservice has changed. The method 400 may, or may not, be performed based upon the extent of the code change. For example, if the code change is relatively minor, there may be no need to perform the method 400. The method 400 may be performed on an ad hoc basis, or on a regularly recurring basis. As well, the method 400 may be instantiated automatically in response to a revision of microservice code, or the method 400 may be initiated by personnel, such as by the developer who implemented the code change.

D. Further Example Embodiments

Following are some further example embodiments of the invention. These are presented only by way of example and are not intended to limit the scope of the invention in any way.

Embodiment 1. A method, comprising: identifying a changed microservice whose code has been changed; mapping, for each microservice in a group of microservices that includes the changed microservice, microservice dependencies associated with the changed microservice; determining, for each microservice in the group, a relative risk that the microservice will be adversely affected by the change to the code of the changed microservice; and based on the respective relative risks, generating a test order indicating an order in which the microservices in the group will be tested.

Embodiment 2. The method as recited in embodiment 1, wherein the relative risk for each microservice in the group corresponds to a respective distance between that microservice and the changed microservice.

Embodiment 3. The method as recited in embodiment 2, wherein as between first and second distances, where the first distance is greater than the second distance, the microservice at the first distance has a relatively lower risk of a problem occurring due to the code change than the microservice at the second distance.

Embodiment 4. The method as recited in any of embodiments 2-3, wherein the distances respectively associated with the microservices in the group are determined by traversing a graphical representation of a service mesh.

Embodiment 5. The method as recited in any of embodiments 1-4, wherein mapping microservice dependencies comprises one or both of: identifying a microservice that is a consumer of the changed microservice; and, identifying a microservice that is provided to the changed microservice.

Embodiment 6. The method as recited in any of embodiments 1-5, wherein the tests are ordered from highest risk to lowest risk of the respective associated microservices.

Embodiment 7. The method as recited in any of embodiments 1-6, wherein the microservice dependencies are mapped using information included in a service mesh.

Embodiment 8. The method as recited in any of embodiments 1-7, wherein each microservice corresponds to a different respective test.

Embodiment 9. The method as recited in any of embodiments 1-8, wherein a microservice immediately downstream of the changed microservice has a relatively higher relative risk than either of: a microservice upstream of the changed microservice; and a microservice downstream of the microservice that is immediately downstream of the changed microservice.

Embodiment 10. The method as recited in any of embodiments 1-9, further comprising performing testing of each of the microservices in the test order.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
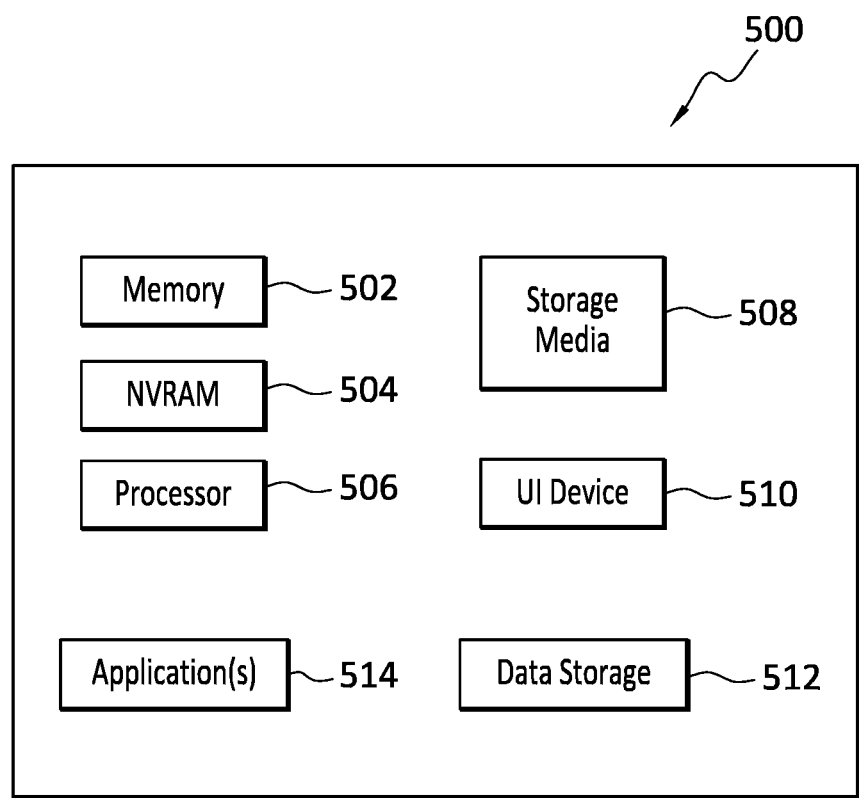
FIG. 5 discloses aspects of an example host device.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying a changed microservice whose code has been changed;
   mapping, for each microservice in a group of microservices that includes the changed microservice, microservice dependencies associated with the changed microservice;
   determining, for each microservice in the group, a relative risk that the microservice will be adversely affected by the change to the code of the changed microservice, wherein the relative risk for each microservice in the group corresponds to a respective distance between that microservice and the changed microservice, and wherein the distances respectively associated with the microservices in the group are determined by a traversing process that traverses a graphical structure having nodes that each represent a respective microservice, and the traversing process commences at a root location and traverses all the microservices that are at a first distance from the changed microservice; and
   based on the respective relative risks, generating a test order indicating an order in which the microservices in the group will be tested.

2. The method as recited in claim 1, wherein the traversing process is performed for all microservices up to, and including, a distance 'n' from the changed microservice, wherein 'n' is any positive integer equal to, or greater than, 1.

3. The method as recited in claim 2, wherein as between first and second distances, where the first distance is greater than the second distance, the microservice at the first distance has a relatively lower risk of a problem occurring due to the code change than the microservice at the second distance.

4. The method as recited in claim 2, wherein any microservices, represented by a respective node in the graphical structure, that are beyond a boundary distance greater than 'n' from the root node are not traversed by the traversing process.

5. The method as recited in claim 1, wherein mapping microservice dependencies comprises one or both of: identifying a microservice that is a consumer of the changed microservice; and, identifying a microservice that is provided to the changed microservice.

6. The method as recited in claim 1, wherein the tests are ordered from highest risk to lowest risk of the respective associated microservices.

7. The method as recited in claim 1, wherein the microservice dependencies are mapped using information included in a service mesh.

8. The method as recited in claim 1, wherein each microservice corresponds to a different respective test.

9. The method as recited in claim 1, wherein a microservice immediately downstream of the changed microservice has a relatively higher relative risk than either of: a microservice upstream of the changed microservice; and a microservice downstream of the microservice that is immediately downstream of the changed microservice.

10. The method as recited in claim 1, further comprising performing testing of each of the microservices in the test order.

11. A non-transitory storage medium having stored therein instructions that are executable by one or more hardware processors to perform operations comprising:
   identifying a changed microservice whose code has been changed;
   mapping, for each microservice in a group of microservices that includes the changed microservice, microservice dependencies associated with the changed microservice;
   determining, for each microservice in the group, a relative risk that the microservice will be adversely affected by the change to the code of the changed microservice, wherein the relative risk for each microservice in the group corresponds to a respective distance between that microservice and the changed microservice, and wherein the distances respectively associated with the microservices in the group are determined by a traversing process that traverses a graphical structure having nodes that each represent a respective microservice, and the traversing process commences at a root location and traverses all the microservices that are at a first distance from the changed microservice; and
   based on the respective relative risks, generating a test order indicating an order in which the microservices in the group will be tested.

12. The non-transitory storage medium as recited in claim 11, wherein the traversing process is performed for all microservices up to, and including, a distance 'n' from the changed microservice, wherein 'n' is any positive integer equal to, or greater than, 1.

13. The non-transitory storage medium as recited in claim 12, wherein as between first and second distances, where the first distance is greater than the second distance, the microservice at the first distance has a relatively lower risk of a problem occurring due to the code change than the microservice at the second distance.

14. The non-transitory storage medium as recited in claim 12, wherein any microservices, represented by a respective node in the graphical structure, that are beyond a boundary distance greater than 'n' from the root node are not traversed by the traversing process.

15. The non-transitory storage medium as recited in claim 11, wherein mapping microservice dependencies comprises one or both of: identifying a microservice that is a consumer of the changed microservice; and, identifying a microservice that is provided to the changed microservice.

16. The non-transitory storage medium as recited in claim 11, wherein the tests are ordered from highest risk to lowest risk of the respective associated microservices.

17. The non-transitory storage medium as recited in claim 11, wherein the microservice dependencies are mapped using information included in a service mesh.

18. The non-transitory storage medium as recited in claim 11, wherein each microservice corresponds to a different respective test.

19. The non-transitory storage medium as recited in claim 11, wherein a microservice immediately downstream of the changed microservice has a relatively higher relative risk than either of: a microservice upstream of the changed microservice; and a microservice downstream of the microservice that is immediately downstream of the changed microservice.

20. The non-transitory storage medium as recited in claim 11, wherein the operations further comprise performing testing of each of the microservices in the test order.

* * * * *